United States Patent
Lundin et al.

(10) Patent No.: US 11,610,138 B2
(45) Date of Patent: Mar. 21, 2023

(54) MACHINE LEARNING-BASED INFERENCE OF GRANULAR FONT PROPERTIES

(71) Applicant: salesforce.com, inc., San Francisco, CA (US)

(72) Inventors: Jessica Lundin, Seattle, WA (US); Owen Winne Schoppe, Orinda, CA (US); Alan Martin Ross, San Francisco, CA (US); Brian J. Lonsdorf, Belmont, CA (US); David James Woodward, Westfield, IN (US); Sönke Rohde, San Francisco, CA (US); Michael Reynolds Sollami, Cambridge, MA (US); Chetan Ramaiah, Palo Alto, CA (US)

(73) Assignee: Salesforce, Inc., San Francisco, CA (US)

( * ) Notice: Subject to any disclaimer, the term of this patent is extended or adjusted under 35 U.S.C. 154(b) by 378 days.

(21) Appl. No.: 16/854,913

(22) Filed: Apr. 22, 2020

(65) Prior Publication Data

US 2021/0334666 A1 Oct. 28, 2021

(51) Int. Cl.
| | |
|---|---|
| *G06V 30/244* | (2022.01) |
| *G06N 5/02* | (2023.01) |
| *G06F 17/16* | (2006.01) |
| *G06F 40/109* | (2020.01) |
| *G06N 20/00* | (2019.01) |
| *G06N 5/04* | (2023.01) |
| *G06T 7/00* | (2017.01) |

(52) U.S. Cl.
CPC .............. *G06N 5/02* (2013.01); *G06F 17/16* (2013.01); *G06F 40/109* (2020.01); *G06N 5/04* (2013.01); *G06N 20/00* (2019.01); *G06T 7/0002* (2013.01); *G06V 30/245* (2022.01)

(58) Field of Classification Search
CPC ............ G06N 5/02; G06N 20/00; G06N 3/02; G06N 5/04; G06F 40/109; G06V 30/245; G06V 30/30242; G06V 30/244; G06T 7/0002
See application file for complete search history.

(56) References Cited

U.S. PATENT DOCUMENTS

| | | | |
|---|---|---|---|
| 9,875,429 B2 * | 1/2018 | Wang ................... | G06V 10/454 |
| 10,891,476 B2 * | 1/2021 | Wang ................... | G06V 10/82 |

OTHER PUBLICATIONS

Myfonts Inc., "WhatTheFont," Date Unknown, three pages, [Online] [Retrieved on May 1, 2020] Retrieved from the Internet <URL: https://www.myfonts.com/WhatTheFont/>.

* cited by examiner

*Primary Examiner* — Antonio A Caschera
(74) *Attorney, Agent, or Firm* — Fenwick & West LLP

(57) ABSTRACT

A textual properties model is used to infer values for certain font properties of interest given certain text-related data, such as rendered text images. The model may be used for numerous purposes, such as aiding with document layout, identifying font families that are similar to a given font families, and generating new font families with specific desired properties. In some embodiments, the model is trained from a combination of synthetic data that is labeled with values for the font properties of interest, and partially-labeled data from existing "real-world" documents.

23 Claims, 7 Drawing Sheets

3. Character Pixel Density

Font A
20% Black

Font B
10% Black

4. Italic Angle

Font A
0 deg

Font B
10 deg

5. Serif

Font A
Sans Serif

Font B
Trans. Serif

Font C
Slab Serif

6. Source vs Rendered Font Props.

7. Statistical Font Properties

MACHINE LEARNING-BASED INFERENCE OF GRANULAR FONT PROPERTIES

FIELD OF ART

This disclosure relates generally to computer systems and machine learning techniques for inferring and using font properties of font families.

BACKGROUND

The appearance of text in documents such as web pages is determined by font character data for the font family (e.g., "Times New Roman") that is used, as well as by any specified text rendering guidelines (hereinafter "design metadata font properties"), such as font size and line height. However, the design metadata font properties are imprecise guidelines. For example, a particular font, when requested by design metadata font properties to be rendered with a 72-pixel line height, might actually be rendered at 74 pixels; other fonts might be rendered with a 72-pixel line height, or a 69-pixel line height. There are additionally many other font properties of interest whose values are a consequence of the rendering process and which are not explicitly listed, such as the size of the horizontal visual gap between characters, the degree of angle for italic characters, the character pixel density, and the way in which serifs are styled. In some cases, such as proprietary fonts, the font files (e.g., SVG (Scalable Vector Graphics) for individual characters) used for rendering are not even readily available. In consequence, the ability to perform font-based design and analysis is limited and imprecise.

BRIEF DESCRIPTION OF THE DRAWINGS

Embodiments of the disclosure have other advantages and features which will be more readily apparent from the following detailed description and the appended claims, when taken in conjunction with the examples in the accompanying drawings, in which:

DETAILED DESCRIPTION

The figures and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Figure 1:
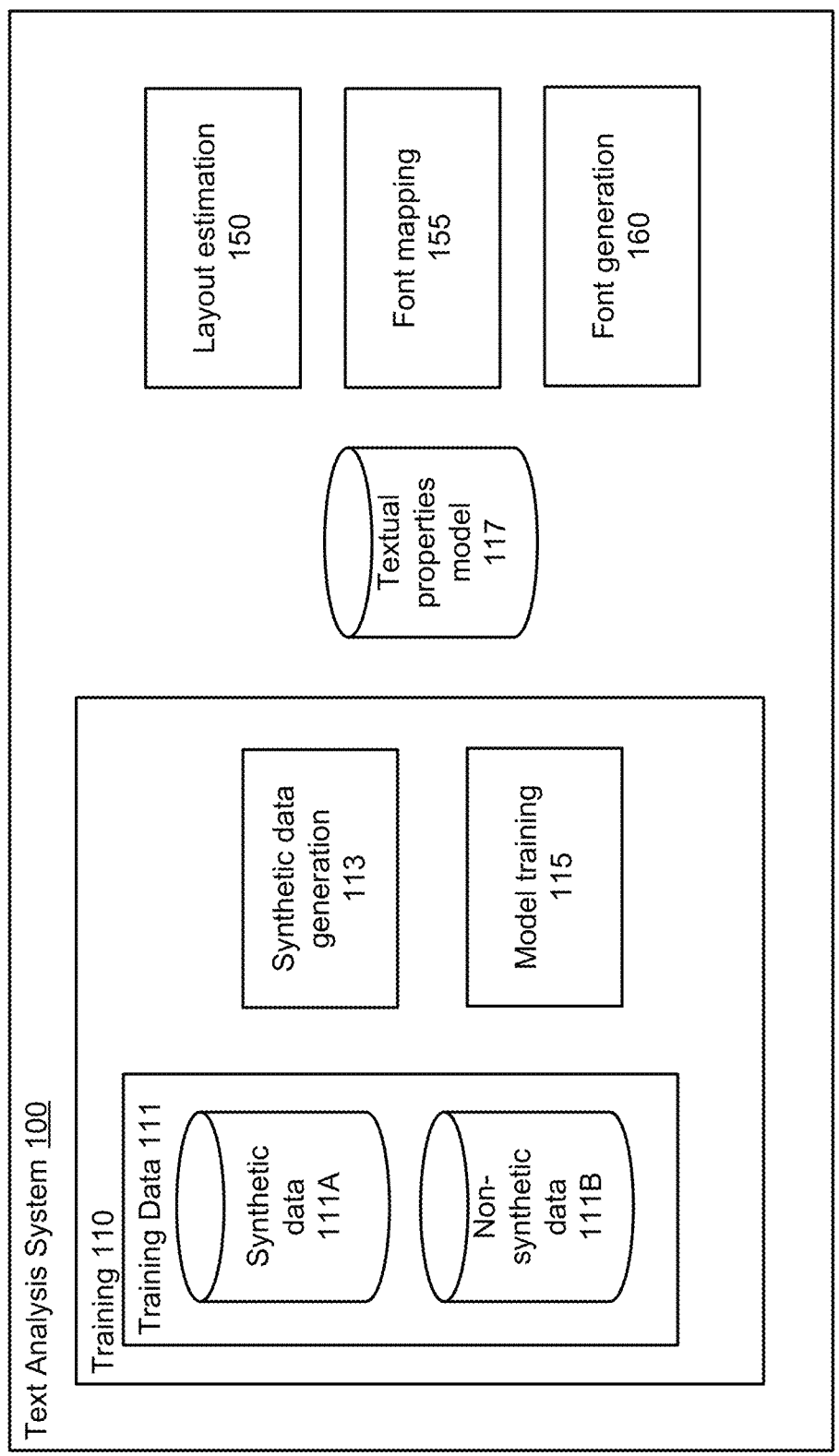
FIG. 1 illustrates the modules of a text analysis system, according to some embodiments.

FIG. 1 illustrates the modules of a text analysis system 100, according to some embodiments. The text analysis system 100 has a model 117 derived from machine learning techniques that infers values of a plurality of granular text properties of interest. In some embodiments, the input to the model 117 is rendered text images (i.e., pixel data produced by a renderer, such as a browser); in other embodiments, the input is design metadata font properties. Use of the textual properties model 117 for text property inference provides more precise data about how text will appear when rendered than is otherwise available. This enables numerous additional textual operations that would not otherwise be possible, such as more precise determination of how rendered text will appear (e.g., in comparison to other text), selection of "lookalike" fonts as substitutes for other fonts, and generation of new fonts according to specified desired properties.

In some embodiments (as illustrated in FIG. 1), the text analysis system 100 includes a training module 110 that itself generates the textual properties model 117. In other embodiments, however, the text analysis system 100 may instead obtain the trained model 117 from another system. If included, the training module 110 includes or has access to training data 111 that is used as input to train the textual properties model 117, a synthetic data generation module 113 that generates the "synthetic" data portion of the training data 111, and a model training module that does the actual generation of the textual properties model 117 from the training data 111.

The training data 111 includes one or both of synthetic data 111A and non-synthetic data 111B. In some embodiments, both synthetic data 111A and non-synthetic data 111B include rendered text images—that is, the pixel data produced by a text renderer, such as a web browser, for textual data—and values for a set of font properties of interest. More specifically, the synthetic data 111A include rendered text images that are generated by the synthetic data generation module 113 according to pre-specified values of the font properties of interest. Thus, the "labels" (the values of the font properties) of the data are already known, since they are used to generate the resulting rendered text images. For example, the synthetic data generation module 113 could generate text using a set of font families for which the font properties of interest (e.g., x-height) are already entirely or partially known, such as by being listed in known font databases. If the font properties are not already known, the synthetic data generation module 113 can derive values for the font properties of interest by converting text into SVG outlines and performing image analysis on the outlines (e.g., deriving the x-height of characters by counting pixels). The synthetic data generation module 113 can provide the text as input to a text renderer such as a browser and save the resulted rendered pixels (e.g., from the screen buffer) in association with the text and with the known values of the font properties of interest. In contrast, the non-synthetic data 111B include "real-world" rendered text, though with possibly some of the font property values unknown. For example, in one embodiment, the non-synthetic data 111B is generated by obtaining portions of rendered text from public web pages and partially specifying the font property values of interest based on information known about the web sites of origin. For example, the training module 110 could automatically crawl a number of pre-specified web sites, use a browser to render text on those pages, and specify values for any known attributes of those websites (e.g., that the font pixel density is 1.8 for certain portions).

Figure 2A:
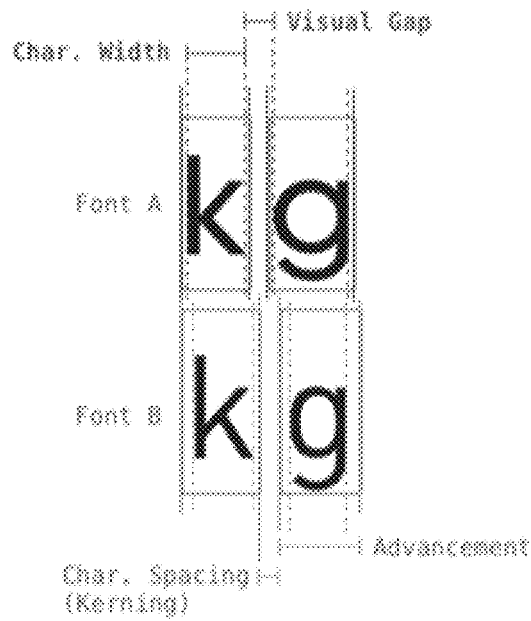
FIGS. 2A-2H illustrate examples of various font properties that may be analyzed, according to some embodiments.
Figure 2B:
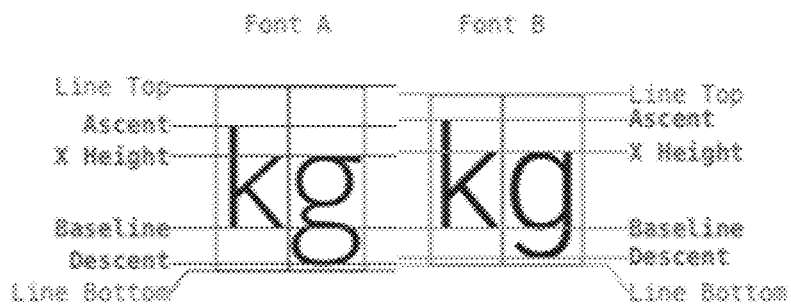
Figure 2C:
Figure 2C:
Figure 2D:
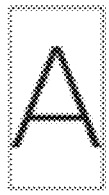
Figure 2D:
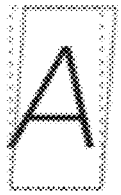
Figure 2E:
Figure 2E:
Figure 2E:
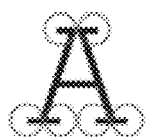
Figure 2F:
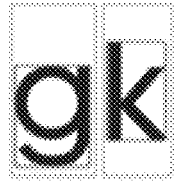
Figure 2G:
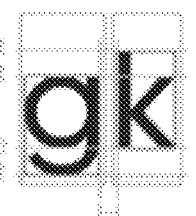
Figure 2H:
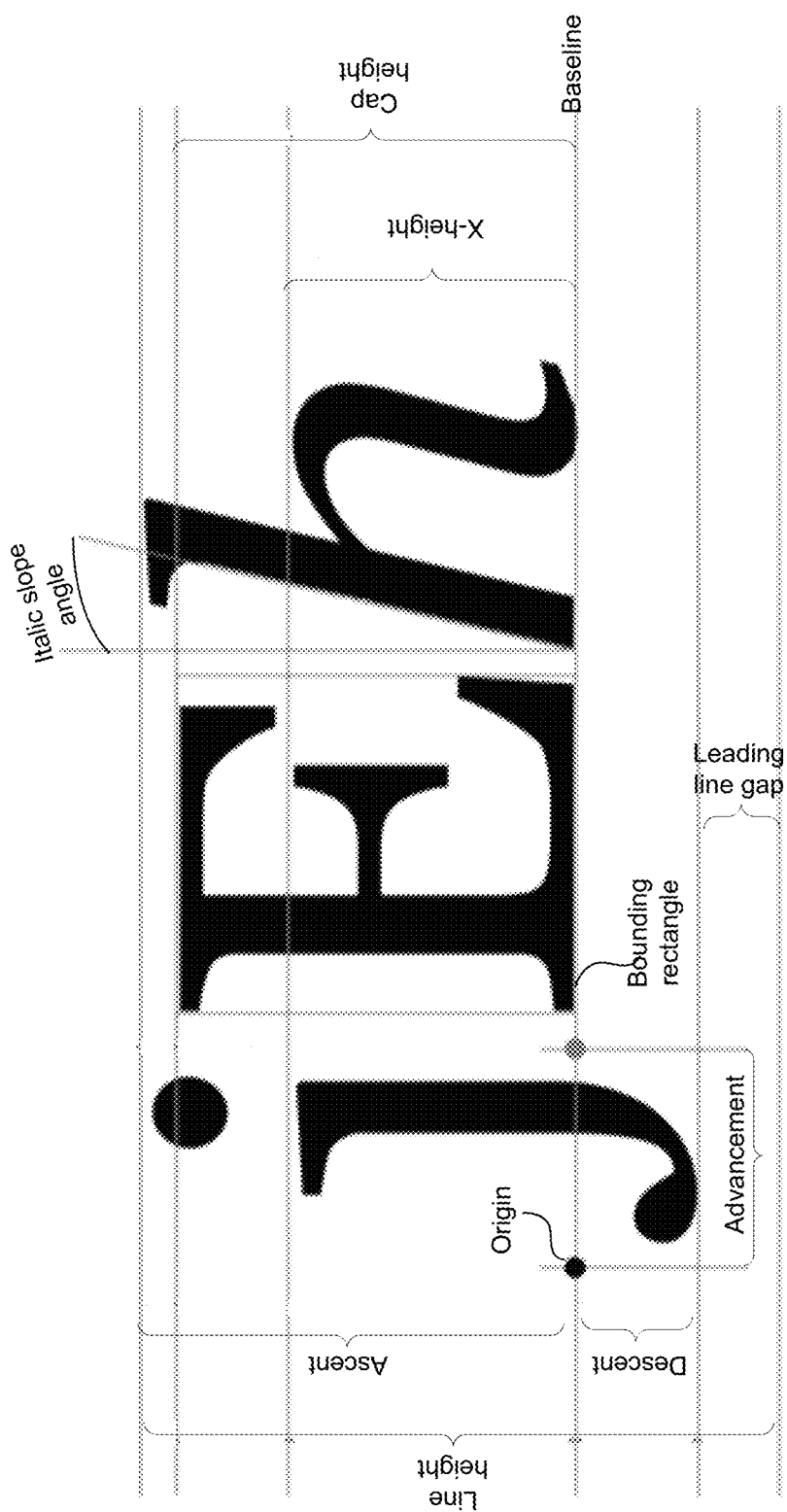

The font properties of interest (also referred to herein as "inferred font properties") may include, in different embodiments, any or all of: horizontal character metrics (e.g., character width, visual gap), vertical character metrics (e.g., ascent, x-height, baseline, descent}, character pixel density, italic slant angle, serif type, certain statistical values derived from the different characters in the font (e.g., median ascent, median X height, median descent, median baseline, median spacing), and/or source vs. rendered font properties (e.g., CV bounding box). Various ones of these properties are visually illustrated in FIGS. 2A-2G. For additional reference, FIG. 2H additionally illustrates other common font properties.

Figure 3:
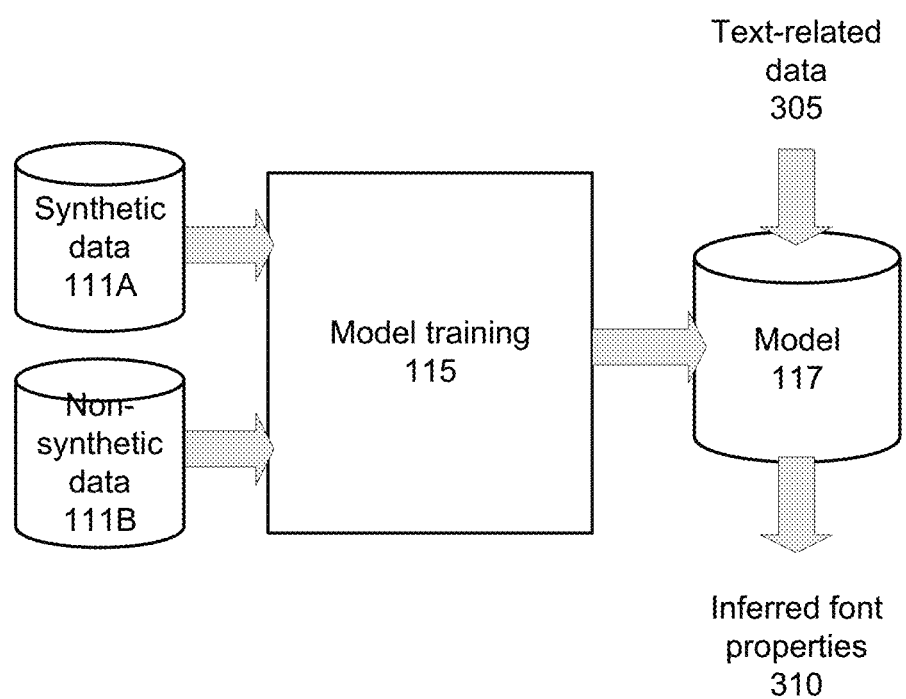
FIG. 3 is a data flow diagram illustrating the inputs and outputs of a model training module, as well as inputs and outputs of the resulting textual properties module, according to some embodiments.

As illustrated in FIG. 3, the model training module 115 takes the training data 111 as input and trains the textual properties model 117 using a machine learning algorithm. In some embodiments, the model training module 115 trains the model 117 as a neural network, such as a convolutional neural network (CNN); in other embodiments the model 117 is trained using a different training algorithm, such as a random forest algorithm. In some embodiments, the rotation and scale invariance of the model 117 are improved by building the invariance directly into the network architecture of the neural network forming the model. In some embodiments, this is achieved by modifying existing topological structures within the neural network, such as by using custom twistor convolutional layers representing convolution operators that when applied to an input array with m input channels effectively performs n*m distinct angular convolutions of a random rotation factor across the spatial dimensions to produce an output array with n channels. Advantageously, no explicit affine transform parameters need to be learned with additional layers. As a result of the rotation and scale invariance, the model 117 is effective at inferring font properties from text, even when the text is rotated at a different angle, or scaled at a different scaling factor, than the examples upon which the model 117 was trained. In some embodiments, performance of the model 117 is further improved by jointly training the model on auxiliary prediction tasks of fine-grained typographical attributes like serif descriptors (e.g., e-bars, stress, obliqueness, etc.), multi-story casing, or the like.

In some embodiments, the model training module 115 employs large-scale unsupervised pre-training on unlabeled data prior to training on labeled data. In the pre-training phase, the model 117 is preliminarily trained to cluster rendered text image examples lacking associated font property value labels but having other properties with specified values, such as design metadata font properties like the font families employed or line heights, as found through examination of scraped web pages. This clustering primes the weights of the model 117, e.g., with the layers of a neural network model being composed of the primed weights rather than random weights at the start of the training, such that the later training phase ultimately results in a model 117 with a higher degree of accuracy.

As further illustrated in FIG. 3, once trained, the textual properties model 117 accepts as input text-related data 305 and outputs inferred values 310 for the font properties that the model was trained to recognize. In some embodiments, the text-related data 305 is rendered text image data 305 (e.g., the pixels generated by a web browser for text on a given web page); in other embodiments, the text-related data is design metadata font properties, which a renderer such as a web browser uses to produce rendered text image data. (Although the majority of the examples that follow refer to embodiments in which the text-related data 305 is a rendered text image, it is appreciated that in other embodiments the text-related data 305 can be design metadata font properties.) For example, given the rendered text image data for a particular web page (or, in other embodiments, the design metadata properties such as font family, line height, and the like), the model 117 might infer that it results in a 70-point line height, font density of 1.2, and an italic slant angle of 25 degrees, among other inferred font properties.

Returning to FIG. 1, the ability of the model 117 to infer font properties not specified within the design metadata font properties for a document enables a number of additional useful applications. Some of these are now discussed with respect to the modules 150, 155, and 160.

The layout estimation module 150 uses the textual properties model 117 to predict with great precision the visual properties that given text will have when rendered. These predictions in turn can be used by content authors when designing the layouts of their textual documents, and/or by automatic layout software that places text on a page to achieve a given visual effect. This can be particularly valuable when laying out a document using a font about which little information is known (e.g., a proprietary font). As one example, font properties can be determined to achieve a desired value of a particular inferred font property. For instance, when designing a page using a particular proprietary font family about which little information is known, it might be known that there are 100 pixels of vertical free space in which to display a header for the page, and it might be desirable that the header text be as large as possible while still staying within the 100 pixel constraint. In such a case, the textual properties model 117 can be applied to some text rendered in the proprietary font (or, in other embodiments, to design metadata font properties of the page) to infer values for the font properties of interest (or, if this has been previously done and the inferred values cached, the cached values can be read). Assuming in this example that values for vertical character properties such as ascent, baseline, and descent are inferred by the model 117, these values can be applied to calculate precisely how large the text can be displayed in the given font family while still staying within the 100 pixel constraint.

As another example, fonts can be compared to achieve a particular font contrast when used together on a page. For instance, assume that a document had a particular heading font family, and a different body font family, and it were desired that the heading text would stand out visually from the paragraph text (as measured by a ratio of respective text pixel densities). In this case, in embodiments in which the model 117 inputs rendered text images, the layout estimation module 150 could cause some text in the two font families to be rendered, then apply the model 117 to the resulting rendered text images to determine whether the relative pixel densities indicate that the heading font has sufficient visual prominence relative to the body font.

The font mapping module 155 uses the model 117 to identify a font family that is similar to a given font family, according to some similarity metric. Such identification can be used, for example, to identify "look-alike" font families, such as the most similar font families in the public domain. This can be valuable as a way to select a public domain font family to use instead of a given proprietary font, for example. Another example of its use is when specifying a replacement font family to use in case a particular font family is not available to a given client renderer. In such a case, where a particular font family is specified as the default font for displaying given text, the font mapping module 155 can (in embodiments in which the model 117 inputs rendered text images) render text in the specified default font family, apply the model 117 to the rendered text to obtain a list of values for the interred font properties, select one or more other font families with similar values for the inferred font properties, and specify those other font families as backup font families for rendering the text.

In one particular example, the font mapping module 155 selects a public-domain font family that will produce a similar visual effect to the font family used on a particular target website. Specifically, (in embodiments in which the model 117 is applied to rendered text images) the font mapping module 155 applies a renderer, such as a web browser, to pages of the web site, then applies the model 117 to the resulting rendered text images. This in turn results in a list of values for the inferred font properties for which the model was trained. These inferred font property values are compared to the font property values of font families of a library of known font families according to a given similarity metric, and the most similar font family in the library is selected (or recommended).

The font similarity metric may be hardcoded, or (in some embodiments) it may be user-specified. For example, users may designate some font properties as being more important than others as part of the similarity determination. This may be accomplished, for example, by directly or indirectly specifying numerical weightings for the various font properties.

In some embodiments, a "lookalike" font family need not be determined for a document or page as a whole, but rather may be determined in a granular manner, with respect to certain portions of the documents. For example, one lookalike font family can be selected for the primary header font family on a given website, and another can be selected for the first-level body font family, for example.

The font generation module 160 generates a new font family with specified desired properties. For example, a user could specify that s/he would like to generate a new font family that is like a particular target font family, but with certain specified differences. As another example, a user could specify that s/he would like to generate a new font family that is like a set of different particular font families, with the option to specify in what way, and/or to what extent, the new font family should be similar to or different from each of the font families in the set, and the font generation module 160 would accordingly combine the values of the font properties of interest for the various fonts in the set. For instance, the user could specify the particular font properties that are of most importance, or that the new font should be 80% like font family A, 10% like font family B, and 10% like font family C, for example, and these specifications would be used to determine how to combine the font property values of the different fonts to determine the desired font property values of the new font family.

In some embodiments, the font generation module 160 uses generative/discriminative algorithms to generate the new font family, with a generator and a discriminator alternatively trained. The generator converts inputs into observations intended to appear as if they are from the original data set, and the discriminator is a supervised model that outputs a probability indicating whether the output of the generator represents a genuine font family. In some embodiments, the output of the generative/discriminative algorithm is an image of a font family, which can be input into the model 117 to infer font properties, and which the font generation module 160 can compare to the specified desired properties. If the inferred font properties are within some threshold distance of the specified desired properties, then the generated image is used as the final output; if not, the font generation module 160 continues to generate.

Figure 4:
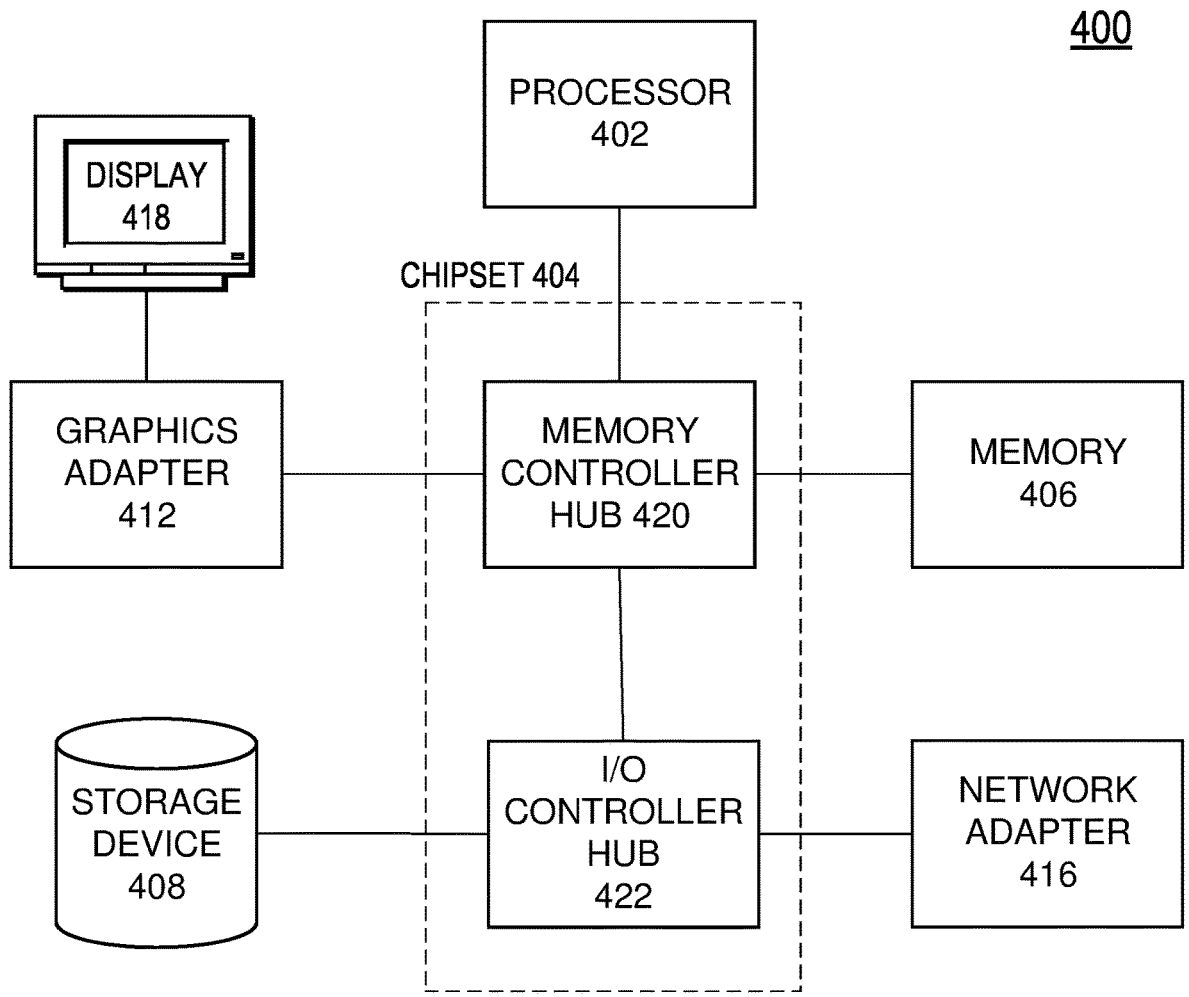
FIG. 4 is a high-level block diagram illustrating physical components of a computer used as part or all of the text analysis system from FIG. 1, according to one embodiment.

FIG. 4 is a high-level block diagram illustrating physical components of a computer 400 used as part or all of the text analysis system 120 from FIG. 1, according to one embodiment. Illustrated are at least one processor 402 coupled to a chipset 404. Also coupled to the chipset 404 are a memory 406, a storage device 408, a graphics adapter 412, and a network adapter 416. A display 418 is coupled to the graphics adapter 412. In one embodiment, the functionality of the chipset 404 is provided by a memory controller hub 420 and an I/O controller hub 422. In another embodiment, the memory 406 is coupled directly to the processor 402 instead of the chipset 404.

The storage device 408 is any non-transitory computer-readable storage medium, such as a hard drive, compact disk read-only memory (CD-ROM), DVD, or a solid-state memory device. The memory 406 holds instructions and data used by the processor 402. The graphics adapter 412 displays images and other information on the display 418. The network adapter 416 couples the computer 400 to a local or wide area network.

As is known in the art, a computer 400 can have different and/or other components than those shown in FIG. 4. In addition, the computer 400 can lack certain illustrated components. In one embodiment, a computer 400 acting as a server may lack a graphics adapter 412, and/or display 418, as well as a keyboard or pointing device. Moreover, the storage device 408 can be local and/or remote from the computer 400 (such as embodied within a storage area network (SAN)).

As is known in the art, the computer 400 is adapted to execute computer program modules for providing functionality described herein. As used herein, the term "module" refers to computer program logic utilized to provide the specified functionality. Thus, a module can be implemented in hardware, firmware, and/or software. In one embodiment, program modules are stored on the storage device 408, loaded into the memory 406, and executed by the processor 402.

Embodiments of the entities described herein can include other and/or different modules than the ones described here. In addition, the functionality attributed to the modules can be performed by other or different modules in other embodiments. Moreover, this description occasionally omits the term "module" for purposes of clarity and convenience.

Other Considerations

The processes described above can be implemented on different types of computer systems, including multi-tenant computer systems. In a multi-tenant computer system, multiple tenants share the use of a computer system, but without access or knowledge to each other's data or activities. Each tenant may be an enterprise. As an example, one tenant might be a company that employs a sales force where each salesperson uses a client device to manage their sales process. Thus, a user might maintain contact data, leads data, customer follow-up data, performance data, goals and progress data, etc., all applicable to that user's personal sales process.

In one embodiment, a multi-tenant computer system implements a web-based customer relationship management (CRM) system. For example, the system includes application servers configured to implement and execute CRM software applications as well as provide related data, code, forms, webpages and other information to and from client devices and to store to, and retrieve from, a database system related data, objects, and webpage content. The capabilities described above are part of the CRM software applications. The activity being analyzed may be past, current and future sales transactions.

With a multi-tenant system, data for multiple tenants may be stored in the same physical database. However, tenant data typically is arranged so that data of one tenant is kept logically separate from that of other tenants so that one tenant does not have access to another tenant's data, unless such data is expressly shared. A tenant metadata store stores information that allows identification of data for different tenants, for example, using identifiers that uniquely identify each tenant.

In certain embodiments, the system implements applications other than, or in addition to, a CRM application. For example, the system may provide tenant access to multiple hosted (standard and custom) applications, including a CRM application. According to one embodiment, the system is configured to provide webpages, forms, applications, data and media content to client devices to support the access by client devices as tenants of system. As such, the system provides security mechanisms to keep each tenant's data separate unless the data is shared.

A multi-tenant system may implement security protocols that keep data, applications, and application use separate for different tenants. In addition to user-specific data and tenant-specific data, the system may maintain system level data usable by multiple tenants or other data. Such system level data may include industry reports, news, postings, and the like that are sharable among tenants.

The processes described above may also be implemented on other types of systems, for example client-server systems, mobile technology and devices, mobile networks, wearable devices, tablets, PCs, software-as-a-service, etc.

Alternate embodiments are implemented in computer hardware, firmware, software, and/or combinations thereof. Implementations can be implemented in a computer program product tangibly embodied in a machine-readable storage device for execution by a programmable processor; and method steps can be performed by a programmable processor executing a program of instructions to perform functions by operating on input data and generating output. Embodiments can be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, a processor will receive instructions and data from a read-only memory and/or a random-access memory. Generally, a computer will include one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits) and other forms of hardware.

Although the detailed description contains many specifics, these should not be construed as limiting the scope of this disclosure but merely as illustrating different examples. It should be appreciated that the scope of the disclosure includes other embodiments not discussed in detail above. Various other modifications, changes and variations which will be apparent to those skilled in the art may be made in the arrangement, operation and details of the method and apparatus disclosed herein without departing from the spirit and scope as defined in the appended claims. Therefore, the scope of patent rights should be determined by the appended claims and their legal equivalents.

What is claimed is:

1. A computer-implemented method for inference of font properties based on rendered text, the computer-implemented method comprising:
   obtaining a rendered text image of text in a document;
   training a machine learning model to infer values for a plurality of font properties based on rendered text images, the training using a training set comprising a plurality of partially-labeled rendered text images; and
   using the machine learning model to infer values for font properties of a font family of the rendered text;
   wherein the partially-labeled rendered text images specify values for less than all of the plurality of font properties.

2. The computer-implemented method of claim 1, further comprising obtaining the rendered text image from a web browser textual rendering of text on a web site.

3. The computer-implemented method of claim 1, wherein the font properties for which values are inferred comprise one or more of: horizontal character metrics, vertical character metrics, character pixel density, italic angle, serif type, or character bounding box.

4. The computer-implemented method of claim 1, further comprising training the machine learning model as a convolutional neural network having custom twistor convolutional layers substantially providing textual rotational invariance.

5. The computer-implemented method of claim 1, where the training set additionally comprises a plurality of synthetic rendered text images.

6. The computer-implemented method of claim 5, further comprising generating the synthetic rendered text images, the generating comprising:
   generating support vector graphic (SVG) data for text; and
   deriving values for the plurality of font properties through image analysis of renderings of SVG;
   wherein training the machine learning model uses the derived values for the plurality of font properties as training labels for the synthetic rendered text images.

7. The computer-implemented method of claim 1, further comprising:
   performing unsupervised pre-training on unlabeled rendered text images;
   priming the machine learning model using results of the pre-training; and
   training the primed machine learning model.

8. The computer-implemented method of claim 1, further comprising:
   using the inferred values for the font properties to identify a different font family that is visually similar to the font family of the rendered text.

9. The computer-implemented method of claim 1, further comprising:
   using the machine learning model to infer values for font properties of font families of a plurality of additional rendered text images; and using the inferred values for the font properties of the font family of the rendered text image, and of the inferred values of the font properties of the font families of the plurality of additional rendered text images, to generate a new font family.

10. A computer-implemented method for inference of font properties based on rendered text, the computer-implemented method comprising:
generating a plurality of synthetic rendered text images, the generating comprising:
generating support vector graphic (SVG) data for text in a font family; and
deriving values for a plurality of font properties of the font family through image analysis of renderings of SVG;
training a machine learning model to infer values for the a plurality of font properties based on rendered text images, the training using a training set comprising the plurality of synthetic rendered text images; and
obtaining a rendered text image of text in a document; and
using the machine learning model to infer values for the font properties of the rendered text;
wherein training the machine learning model uses the derived values for the plurality of font properties as training labels for the synthetic rendered text images.

11. The computer-implemented method of claim 10, further comprising obtaining the rendered text image from a web browser textual rendering of text on a web site.

12. The computer-implemented method of claim 10, wherein the font properties for which values are inferred comprise one or more of: horizontal character metrics, vertical character metrics, character pixel density, italic angle, serif type, or character bounding box.

13. The computer-implemented method of claim 10, further comprising training the machine learning model as a convolutional neural network having custom twistor convolutional layers substantially providing textual rotational invariance.

14. The computer-implemented method of claim 10, wherein the training comprises using a training set comprising a plurality of partially-labeled rendered text images and a plurality of synthetic rendered text images.

15. The computer-implemented method of claim 10, further comprising:
performing unsupervised pre-training on unlabeled rendered text images;
priming the machine learning model using results of the pre-training; and
training the primed machine learning model.

16. The computer-implemented method of claim 10, further comprising:
using the inferred values for the font properties to identify a different font family that is visually similar to the font family of the rendered text.

17. A computer-implemented method for inference of font properties based on rendered text, the computer-implemented method comprising:
obtaining a rendered text image of text in a document;
obtaining a machine learning model trained to infer values for a plurality of font properties based on rendered text images; and
using the machine learning model to infer values for font properties of a font family of the rendered text;
using the machine learning model to infer values for font properties of font families of a plurality of additional rendered text images; and
using the inferred values for the font properties of the font family of the rendered text image, and of the inferred values of the font properties of the font families of the plurality of additional rendered text images, to generate a new font family.

18. The computer-implemented method of claim 17, further comprising obtaining the rendered text image from a web browser textual rendering of text on a web site.

19. The computer-implemented method of claim 17, wherein the font properties for which values are inferred comprise one or more of: horizontal character metrics, vertical character metrics, character pixel density, italic angle, serif type, or character bounding box.

20. The computer-implemented method of claim 17, further comprising training the machine learning model as a convolutional neural network having custom twistor convolutional layers substantially providing textual rotational invariance.

21. The computer-implemented method of claim 17, wherein the training comprises using a training set comprising a plurality of partially-labeled rendered text images and a plurality of synthetic rendered text images.

22. The computer-implemented method of claim 17, further comprising:
performing unsupervised pre-training on unlabeled rendered text images;
priming the machine learning model using results of the pre-training; and
training the primed machine learning model.

23. The computer-implemented method of claim 17, further comprising:
using the inferred values for the font properties to identify a different font family that is visually similar to the font family of the rendered text.

* * * * *

UNITED STATES PATENT AND TRADEMARK OFFICE
CERTIFICATE OF CORRECTION

PATENT NO. : 11,610,138 B2
APPLICATION NO. : 16/854913
DATED : March 21, 2023
INVENTOR(S) : Lundin et al.

It is certified that error appears in the above-identified patent and that said Letters Patent is hereby corrected as shown below:

In the Claims

In Column 9, in Claim 10, Lines 17-18, delete "for the a" and insert -- for a --, therefor.

Signed and Sealed this
Eleventh Day of July, 2023

Katherine Kelly Vidal
*Director of the United States Patent and Trademark Office*